United States Patent
Gu et al.

(10) Patent No.: US 11,475,203 B2
(45) Date of Patent: Oct. 18, 2022

(54) COMPUTERIZED SYSTEMS AND METHODS FOR REDUCING LATENCY IN A MODULAR PLATFORM

(71) Applicant: Coupang Corp., Seoul (KR)

(72) Inventors: Ja Mun Gu, Kyunggido (KR); Hong Gwi Joo, Seoul (KR); Seul Ki Lim, Kyunggido (KR); Yinhao Liang, Shanghai (CN)

(73) Assignee: Coupang Corp., Seoul (KR)

( * ) Notice: Subject to any disclaimer, the term of this patent is extended or adjusted under 35 U.S.C. 154(b) by 11 days.

(21) Appl. No.: 16/986,645

(22) Filed: Aug. 6, 2020

(65) Prior Publication Data

US 2022/0043959 A1     Feb. 10, 2022

(51) Int. Cl.
    *G06F 40/103*         (2020.01)
    *G06F 9/54*            (2006.01)
    *G06F 9/451*          (2018.01)

(52) U.S. Cl.
    CPC .......... *G06F 40/103* (2020.01); *G06F 9/451* (2018.02); *G06F 9/547* (2013.01)

(58) Field of Classification Search
    CPC ......... G06F 40/103; G06F 9/547; G06F 9/451
    See application file for complete search history.

(56) References Cited

U.S. PATENT DOCUMENTS

| 2003/0164844 | A1* | 9/2003 | Kravitz | G11B 27/105 |
| | | | | 715/700 |
| 2005/0070259 | A1 | 3/2005 | Kloba et al. | |
| 2006/0136817 | A1 | 6/2006 | Burago et al. | |
| 2012/0331484 | A1* | 12/2012 | Vickers | G06F 9/4493 |
| | | | | 719/316 |

(Continued)

FOREIGN PATENT DOCUMENTS

| CN | 107562424 A | 1/2018 |
| CN | 107924411 A | 4/2018 |

(Continued)

OTHER PUBLICATIONS

International Search Report and Written Opinion in International Application No. PCT/IB2021/051247, dated May 18, 2021 (9 pages).

(Continued)

*Primary Examiner* — Stephen S Hong
*Assistant Examiner* — Nicholas Hasty
(74) *Attorney, Agent, or Firm* — Finnegan, Henderson, Farabow, Garrett & Dunner LLP

(57) ABSTRACT

Systems and methods are provided for modular loading of information on a user interface, comprising receiving, by a mobile service gateway, a request for access to a mobile application platform from a user device, transmitting, to an internal application programming interface (API) gateway, a request for a page layout associated with the mobile application platform, receiving, from the API gateway, the page layout associated with the mobile application platform, receiving one or more modules, assigning the one or more modules to the page layout, and displaying the one or more modules on the mobile application platform. The one or more modules may be developed using a fluent interface that is configured to extract data associated with a request for the one or more modules. Each module may be developed based on the extracted data.

20 Claims, 9 Drawing Sheets

(56) References Cited

U.S. PATENT DOCUMENTS

| | | |
|---|---|---|
| 2014/0029818 A1 | 1/2014 | McCoy et al. |
| 2014/0372415 A1 | 12/2014 | Fernandez-Ruiz |
| 2016/0247246 A1 | 8/2016 | Bluestone et al. |
| 2016/0335140 A1* | 11/2016 | Liu .................. G06F 1/1633 |
| 2017/0046235 A1* | 2/2017 | Straub ............. G06F 11/1474 |
| 2018/0032627 A1 | 2/2018 | Margatan |
| 2019/0238623 A1* | 8/2019 | Vidyananda ........... G06F 9/451 |
| 2020/0021636 A1 | 1/2020 | Lifshitz et al. |
| 2021/0334327 A1* | 10/2021 | Thompson ........... G06F 3/0483 |

FOREIGN PATENT DOCUMENTS

| | | |
|---|---|---|
| CN | 107787470 B | 8/2019 |
| JP | 2003-281038 A | 10/2003 |
| KR | 10-0531150 B1 | 11/2005 |
| KR | 10-2015-0063298 A | 6/2015 |
| KR | 10-1917843 B1 | 11/2018 |
| KR | 10-2138896 B1 | 7/2020 |

OTHER PUBLICATIONS

Taiwanese Office Action in Taiwanese Application No. 109147018, dated Jun. 17, 2021 (22 pages).

Notice of Allowance in counterpart Korean Application No. 10-2020-0178944, dated Mar. 2, 2022 (4 pages).

Examination Notice in counterpart Hong Kong Application No. 22021030788.4, dated May 19, 2022 (7 pages).

* cited by examiner

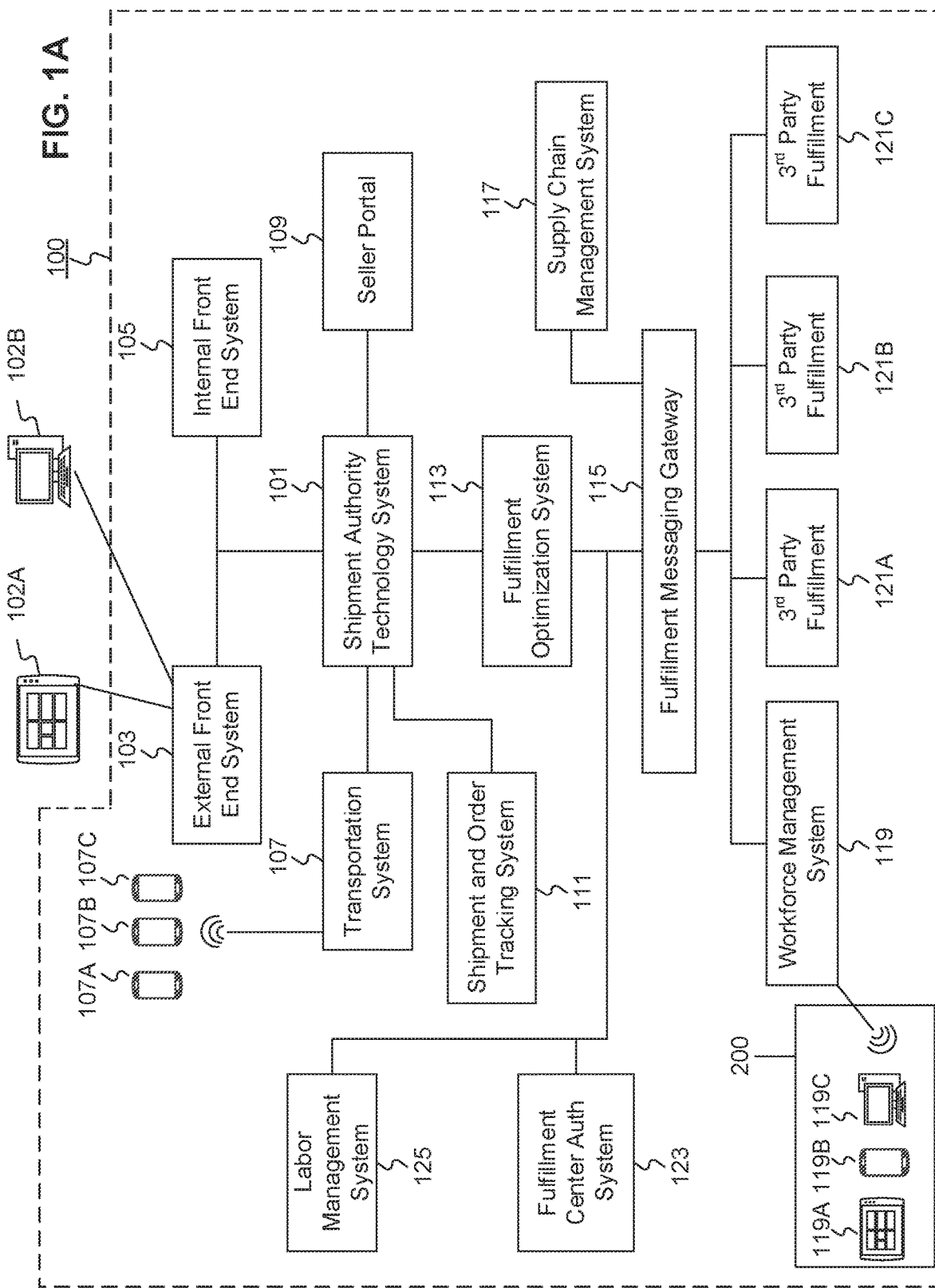

Favorites  Application                                              login  Sign Up  Service center

[ all ]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
| --- | --- | --- | --- | --- | --- |
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
| --- | --- | --- | --- |
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

Order / Payment　　　　　　　　　　　　　　　　Shopping Cart> Order Payment> Order Completion Buyer Information
　　　　　　name
　　　　　　e-mail
　　Mobile Phone　0123456789　[ ]
　　　　Number Recipient information　　[ Change shipping address ]
　　　　　name　　　　　( default shipping )
　　Shipping address
　　　　　Contact
　　　　Delivery　　Front door　　　[ change ]
　　　　Request

Shipping 1 out of 1
　　Tomorrow (Thursday) 11/29 arrival guarantee
　　Mozzarella cheese, 1kg, 2 pieces　　　　1 quantity / free shipping　　　　　　　　Fast Delivery Billing Information
　　Total product price　$20.00
　　　discount coupon　0　　　　No applicable discount coupons available.
　　　　shipping fee　0
　　　　　MyCash　0
　Total payment amount　$20.00 – MyCash to be credited $0.40
　　Payment Method　⦿ ⬜Rocket Transfer　( 2% off )　○⬜Rocket credit/check card　○ Credit/Check Card
　　　　　　　　　　　　　　　　　　　　　　　　　　○ Cellphone　○ Bank transfer (virtual account)

[ Select bank [Selection ▼] ]

[ ] I agree to use future payments with the selected payment method (Selection)

Cash receipts
　　　[ ]　Apply for cash receipt

*A cash receipt will be issued for the amount of cash deposited at the time of settlement of cash.

I have confirmed the order above and agree to the payment.

[ Place Order ]

FIG. 1E

COMPUTERIZED SYSTEMS AND METHODS FOR REDUCING LATENCY IN A MODULAR PLATFORM

TECHNICAL FIELD

The present disclosure generally relates to computerized systems and methods for modular loading of information on a user interface. In particular, embodiments of the present disclosure relate to inventive and unconventional systems relate to reducing latency in modular platforms by modularizing information to be displayed on a user interface such that information can be loaded more quickly on the user interface.

BACKGROUND

Consumers often shop for and purchase various items online through computers, mobile devices, and smart devices. These online shoppers often rely on online platforms, such as software applications associated with various retailers, to search for products and purchase products. Therefore, it is crucial that the computers, mobile devices, smart devices, and other electronic computing devices are capable of providing content to users in a relatively real-time basis with the least amount of latency. For example, users may search for products using the platforms, and in response, computing devices need to immediately display requested content for the users in order to facilitate user transactions and improve customer satisfaction.

However, content to be displayed on these online platforms may have various parameters. For example, content available for display may vary in size, format, processing speed, etc. Often, it may take longer to load and display content that is larger in size than content that takes up less processing speed and capacity. When there are various content that needs to be displayed on the online platform simultaneously, latency in loading one of the content may delay the loading of the rest of the content on a user interface. For instance, if content to be displayed at the top of a display page on a user interface fails to load, this may prevent the rest of the display page from loading on the user interface.

Such latency in displaying content on a user interface may severely reduce a customer's user experience by prolonging the customer's product search, prolonging the customer's online transactions, and reducing the quality of the online platform. Furthermore, manually monitoring the online platform, detecting loading failures, and correcting such failures is often difficult and time-consuming. A customer's user experience would be significantly improved if the online platform proactively accounts for such failures or latency in content loading such that a failure in loading a portion of the display page will not affect the rest of the content to be displayed on the display page.

Therefore, there is a need for improved methods and systems for loading content and information on a user interface so that users may quickly find and purchase products while online shopping, thereby improving user satisfaction and user experience of online platforms.

SUMMARY

One aspect of the present disclosure is directed to a computer-implemented system for modular loading of information on a user interface. The system may comprise at least one processor; and at least one non-transitory storage medium comprising instructions that, when executed by the at least one processor, cause the at least one processor to perform steps. The steps may comprise receiving, by a mobile service gateway, a request for access to a mobile application platform from a user device, transmitting, to an internal application programming interface (API) gateway, a request for a page layout associated with the mobile application platform, receiving, from the API gateway, the page layout associated with the mobile application platform, receiving one or more modules, assigning the one or more modules to the page layout, and displaying the one or more modules on the mobile application platform. The one or more modules may be developed using a fluent interface, and the fluent interface may be configured to extract data associated with a request for the one or more modules. Each module may be developed based on the extracted data.

In some embodiments, one or more modular providers may be configured to parse the extracted data and identify at least one of metadata associated with each module or position information associated with each module. In some embodiments, the one or more modular providers may be configured to aggregate at least one of the identified metadata or position information for the one or more modules. In other embodiments, the mobile service gateway may comprise at least one of authentication service, logging service, or monitoring service. In yet another embodiment, the mobile service gateway may comprise a circuit breaker configured to prevent a failure with the one or more modules from interfering with the display of the one or more modules on the mobile application platform.

In some embodiments, the developed one or more modules may be stored in a database. In some embodiments, the developed one or more modules may comprise an activatable element configured to direct a user of the user device to a destination when activated. In other embodiments, the number of modules assigned to the page layout may be adjustable. In yet another embodiment, the fluent interface may be configured to receive a plurality of requests for data associated with each module in parallel. In some embodiments, the plurality of requests may be prioritized based on a position information associated with each module.

Another aspect of the present disclosure is directed to a method for modular loading of information on a user interface. The method may comprise receiving, by a mobile service gateway, a request for access to a mobile application platform from a user device, transmitting, to an internal application programming interface (API) gateway, a request for a page layout associated with the mobile application platform, receiving, from the API gateway, the page layout associated with the mobile application platform, receiving one or more modules, assigning the one or more modules to the page layout, and displaying the one or more modules on the mobile application platform. The one or more modules may be developed using a fluent interface, and the fluent interface may be configured to extract data associated with a request for the one or more modules. Each module may be developed based on the extracted data.

In some embodiments, one or more modular providers may be configured to parse the extracted data and identify at least one of metadata associated with each module or position information associated with each module. In some embodiments, the one or more modular providers may be configured to aggregate at least one of the identified metadata or position information for the one or more modules. In other embodiments, the mobile service gateway may comprise at least one of authentication service, logging service, or monitoring service. In yet another embodiment, the mobile service gateway may comprise a circuit breaker configured to prevent a failure with the one or more modules from interfering with the display of the one or more modules on the mobile application platform.

In some embodiments, the developed one or more modules may be stored in a database. In some embodiments, the developed one or more modules may comprise an activatable element configured to direct a user of the user device to a destination when activated. In other embodiments, the fluent interface may be configured to receive a plurality of requests for data associated with each module in parallel. In some embodiments, the plurality of requests may be prioritized based on a position information associated with each module.

Yet another aspect of the present disclosure is directed to a computer-implemented system for modular loading of information on a user interface. The system may comprise at least one processor; and at least one non-transitory storage medium comprising instructions that, when executed by the at least one processor, cause the at least one processor to perform steps. The steps may comprise receiving, by a mobile service gateway, a request for access to a mobile application platform from a user device, transmitting, to an internal application programming interface (API) gateway, a request for a page layout associated with the mobile application platform, receiving, from the API gateway, the page layout associated with the mobile application platform, receiving one or more modules, assigning the one or more modules to the page layout, and displaying the one or more modules on the mobile application platform. The one or more modules may be developed using a fluent interface, and the fluent interface may be configured to extract data associated with a request for the one or more modules. One or more modular providers may be configured to parse the extracted data, identify a position information associated with each module, and develop each module based on the extracted data. The developed one or more modules may be stored in a database.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

FIG. 1E depicts a sample Order page that includes items from the virtual shopping cart along with information regarding purchase and shipping, along with interactive user interface elements, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for modular loading of information on a user device. The disclosed embodiments are advantageously capable of reducing latency on a modular platform by dividing a page layout into a plurality of sections, assigning one or more modules to the plurality of sections in the page layout, and displaying the one or more modules.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
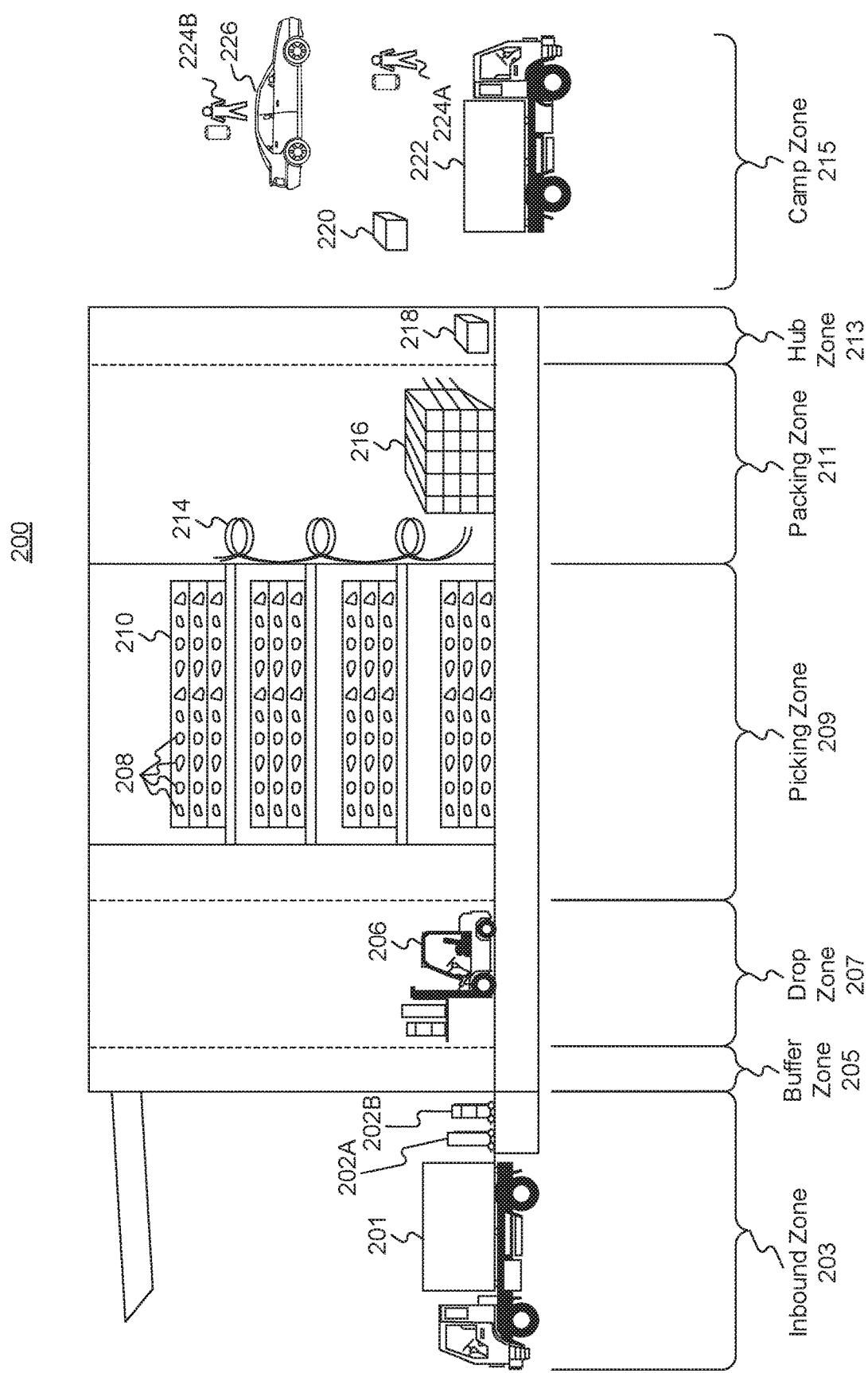
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119б to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
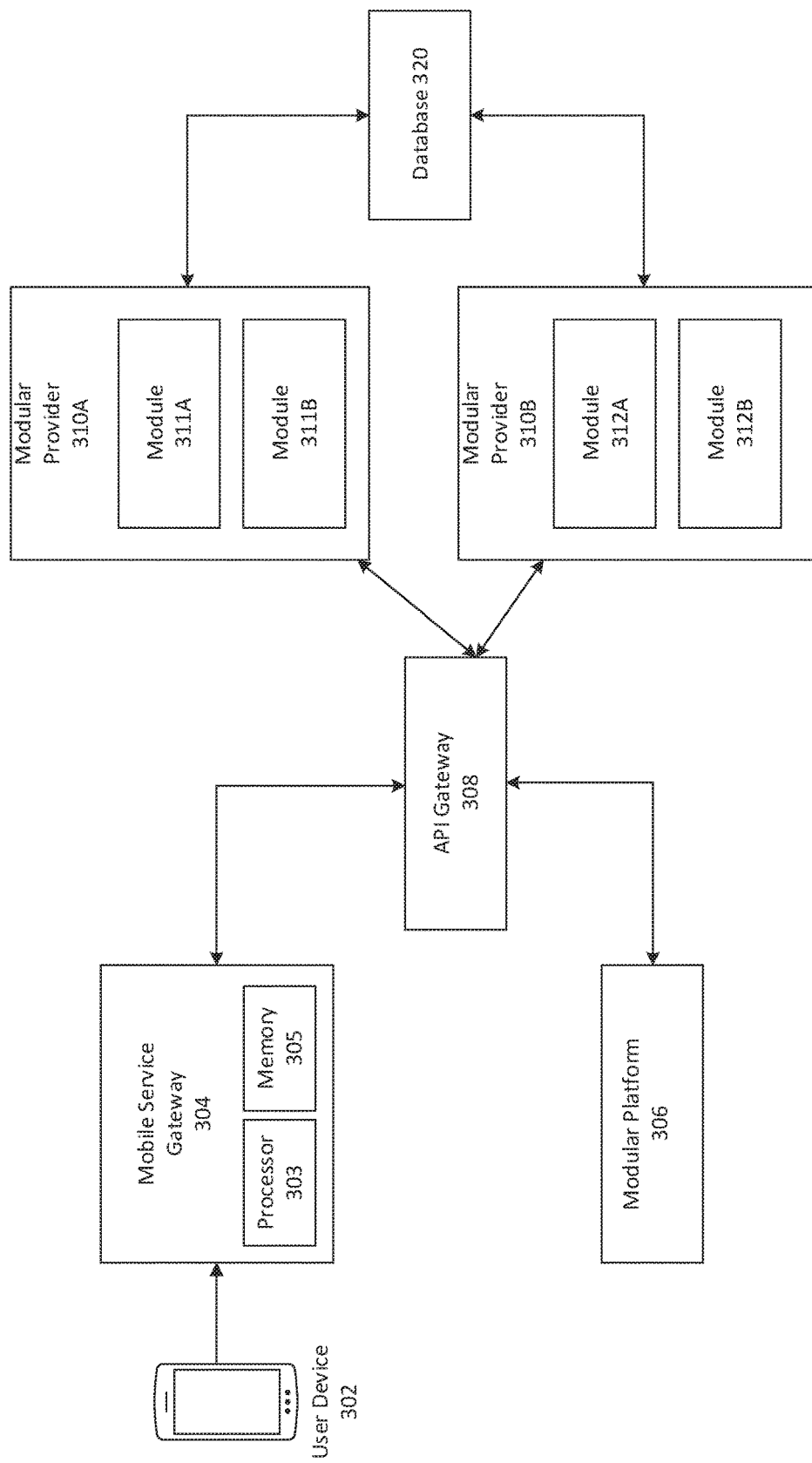
FIG. 3 is a schematic block diagram illustrating an exemplary embodiment of a system comprising computerized systems for modular loading of information on a user interface, consistent with the disclosed embodiments.

Referring to FIG. 3, a schematic block diagram illustrating an exemplary embodiment of a system for modular loading of information on a user interface is shown. As illustrated in FIG. 3, system 300 may comprise a user device 302, a mobile service gateway 304, a modular platform 306, an application programming interface (API) gateway 308, one or more modular providers 310A-B, and database 320. In some embodiments, user device 302, mobile service gateway 304, modular platform 306, API gateway 308, one or more modular providers 310A-B, and database 320 may communicate with each other and with the other components of system 300 via a network or via a direct connection, for example, using a cable. In some other embodiments, system 300 may be a part of system 100 of FIG. 1A and may communicate with the other components of system 100 (e.g., external front end system 103 or internal front end system 105) via a network or via a direct connection, for example, using a cable. User device 302, mobile service gateway 304, modular platform 306, API gateway 308, and one or more modular providers 310A-B may each comprise a single computer or may each be configured as a distributed computer system including multiple computers that interoperate to perform one or more of the processes and functionalities associated with the disclosed examples. In some embodiments, user device 302 may be mobile device 102A or computer 102B.

In some embodiments, mobile service gateway 304 may comprise a processor 303 and a memory 305. User device 302, modular platform 306, API gateway 308, and one or more modular providers 310A-B may also each comprise a processor (not shown) and a memory (not shown). Processor 303 may be one or more known processing devices, such as a microprocessor from the Pentium™ family manufactured by Intel™ or the Turion™ family manufactured by AMD™. Processor 303 may constitute a single core or multiple core processor that executes parallel processes simultaneously. For example, processor 303 may use logical processors to simultaneously execute and control multiple processes. Processor 303 may implement virtual machine technologies or other known technologies to provide the ability to execute, control, run, manipulate, store, etc. multiple software processes, applications, programs, etc. In another example, processor 303 may include a multiple-core processor arrangement configured to provide parallel processing functionalities to allow modular platform 306, API gateway 308, and one or more modular providers 310A-B to execute multiple processes simultaneously. One of ordinary skill in the art would understand that other types of processor arrangements could be implemented that provide for the capabilities disclosed herein.

Memory 305 may store one or more operating systems that perform known operating system functions when executed by processor 303, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memory 305 may be a volatile or non-volatile, magnetic, semiconductor, tape, optical, removable, non-removable, or other type of storage device or tangible computer readable medium.

Database 320 may include, for example, Oracle™ databases, Sybase™ databases, or other relational databases or non-relational databases, such as Hadoop™ sequence files, HBase™, or Cassandra™. Database 320 may include computing components (e.g., database management system, database server, etc.) configured to receive and process requests for data stored in memory devices of the database(s) and to provide data from the database(s). Database 320 may include NoSQL databases such as H Base, MongoDB™ or Cassandra™. Alternatively, database 320 may include relational databases such as Oracle, MySQL and Microsoft SQL Server. In some embodiments, databases 304 and 307 may take the form of servers, general purpose computers, mainframe computers, or any combination of these components.

Database 320 may store data that may be used by processor 303 for performing methods and processes associated with disclosed examples. As shown in FIG. 3, database 320 may receive and store data from mobile service gateway 304, modular platform 306, API gateway 308, and/or one or more modular providers 310A-B. In some embodiments, database 320 may be located in or coupled to modular platform 306. In other embodiments, modular platform 306 may comprise its own database (not shown) in addition to database 320 of system 300.

Data stored in database 320 may include any suitable data associated with content to be displayed on a user interface of user device 302. For example, data stored in database 320 may include data associated with products that can be used to provide product search result page, product advertisement, product listing page, and/or product recommendations on the user interface of user device 302. By way of example, data stored in database 320 may include product type names, product type keywords, related or synonymous product type keywords, product names, product images, product brands, product descriptions, product manufacturer names, product category information, search tag(s) associated with the product, product attribute information, etc.

In some embodiments, data stored in database 320 may include modules 311A-B and 312A-B to be displayed on the user interface of user device 302. For example, one or more modules 311A-B and 312A-B may be developed based on data associated with a product, and the developed modules 311A-B and 312A-B may be stored in database 320. In some embodiments, one or more modules 311A-B and 312A-B may be stored in database 320 and reused to display content on a user interface of another user device. For example, if one or more modules 311A-B and 312A-B comprise a product advertisement to be displayed on the user interface, processor 303 of mobile service gateway 304 may display the one or more modules 311A-B and 312A-B that have been previously developed. Accordingly, the process of loading content on a user interface can be more efficient because modular providers 310A-B may not need to re-develop one or more modules 311A-B and 312A-B each time.

Database 320 may also store information associated with page layout of a user interface provided by a software application. For example, different page layouts may be associated with different user requests. In some embodiments, when a user searches for a specific product using user device 302 and mobile service gateway 304 receives a user request for the specific product, processor 303 may request a page layout that is associated with a product search result page. A page layout associated with a product search result page may be different from a page layout associated with a product listing page. Accordingly, database 320 may store page layouts associated with corresponding user requests.

Modular platform 306 may comprise one or more functions, such as an endpoint mapping service and a page layout service. Accordingly, modular platform 306 may be configured to manage endpoints associated with a requested IP address or URL by a user of user device 302. For example, modular platform 306 may be configured to manage, maintain, and store an endpoint map that returns connections, applications, and/or raw processes that are associated with a requested IP address or URL. In some embodiments, when processor 303 of mobile service gateway 304 receives a request for access to a mobile application platform from user device 302, modular platform 306 may be configured to obtain an endpoint that is mapped to the request. The endpoint mapped to the request may be, for example, a page layout associated with the request, content to be displayed on the page layout associated with the request (e.g., product recommendations), or the like.

The endpoint or the page layout associated with the request may be sent to API gateway 308. For example, modular platform 306 may send the endpoint or page layout associated with the request to API gateway 308. Additionally or alternatively, processor 303 of mobile service gateway 304 may send the endpoint or page layout associated with the request to API gateway 308. API gateway 308 may be configured to aggregate the endpoint information and the page information, such as the page layout, associated with the user request from modular platform 306. API gateway 308 may also receive and aggregate information from mobile service gateway 304. Information received from mobile service gateway 304 may include, but is not limited to, user authentication information, logging information, and/or monitoring information. API gateway 308 may also comprise a fluent interface that may be configured to extract data associated with the user's request. As used herein, a fluent interface may refer to an object-oriented API configured to increase code legibility by creating a domain-specific language (DSL). Because a fluent interface provides an easy-readable, flowing interface that often mimics a DSL, implementing the fluent interface in the API gateway 308 may be useful in extracting data from user requests. For example, the fluent interface may be configured to receive the user's request and extract data associated with the request, such as products associated with the request, keywords associated with the request, or the like in order to deliver content for display that is relevant to the user's request. In some embodiments, the fluent interface may be configured to receive a plurality of user requests in parallel and send data extracted from the requests to one or more modular providers 310A-B in parallel to develop one or more modules 311A-B and 312A-B. In some embodiments, the plurality of user requests may be prioritized based on position information associated with each module. For example, the plurality of requests may be prioritized such that a module to be positioned at the top of a page layout is developed first and a module to be positioned at the bottom of the page layout is developed last.

In some embodiments, modular providers 310A-B may be configured to parse the data extracted from the requests by the fluent interface and identify at least one of metadata associated with each module or position information associated with each module. For example, based on the data extracted from the user request, modular providers 310A-B may determine metadata associated with content to be displayed in each module and also determine where each module will be placed or positioned in the page layout. In some embodiments, modular providers 310A-B may be configured to aggregate the identified metadata and/or position information for the one or more modules and store the aggregated metadata and/or position information in database 320.

As shown in FIG. 3, modular providers 310A-B may be configured to develop one or more modules 311A-B and 312A-B, respectively, with the fluent interface. For example, modular providers 310A-B may be configured to provide information associated with products, such as related products, product recommendations, etc., to the fluent interface in order to develop one or more modules 311A-B and 312A-B to be displayed in the page layout. In some embodiments, modular provider 310A may be responsible for developing modules 311A and 311B, while modular provider 310B may be responsible for developing modules 312A and 312B. While FIG. 3 illustrates two modular providers 310A-B, system 300 may comprise more than two modular providers 310A-B. Additionally or alternatively, each modular provider may be responsible for developing one or more modules. The one or more modules 311A-B and 312A-B developed may be stored in database 320.

In some embodiments, mobile service gateway 304 may comprise a software or hardware that is configured to provide secure communication between user device 302 and backend resources, including modular platform 306 and API gateway 308. In some embodiments, mobile service gateway 304 may be configured to provide various functions, such as an authentication service, logging service, and/or monitoring service. For example, whenever a user of user device 302 requests access to a modular platform, mobile service gateway 304 may authenticate the user, maintain and store log files, and monitor the user's activities on the modular platform.

In other embodiments, mobile service gateway 304 may comprise a page loader configured to display a page layout on a user interface of user device 302, as well as one or more modules 311A-B and 312A-B developed based on the user's request. In some embodiments, mobile service gateway 304 may comprise a circuit breaker that is configured to prevent a failure with the one or more modules 311A-B and 312A-B from interfering with the display of the or more modules 311A-B and 312A-B on the mobile platform. For example, if module 311A failed to load on the mobile platform, the circuit breaker in the mobile service gateway 304 may detect the failure and prevent the failure from displaying the rest of modules 311B and 312A-B on the mobile platform. Accordingly, even if module 311A fails to load on the user interface of user device 302, modules 311B, 312A, and 312B will still load on the user interface. As used herein, a circuit breaker may refer to a software design pattern that is configured to detect failures and encapsulate the logic of preventing a failure from constantly recurring, preventing a failure during maintenance, preventing temporary external system failure, preventing unexpected system difficulties and latencies, or the like.

System 300 may also comprise a network (not shown). A network may be one or more of a wireless network, a wired network or any combination of wireless network and wired network. For example, a network may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, a network may include, but not be limited to, telephone lines, fiber optics, IEEE Ethernet 802.3, a wide area network ("WAN"), a local area network ("LAN"), or a global network such as the Internet. Also a network may support an Internet network, a wireless communication network, a cellular network, or the like, or any combination thereof. A network may further include one network, or any number of the exemplary types of networks mentioned above, operating as a stand-alone network or in cooperation with each other. A network may utilize one or more protocols of one or more network elements to which they are communicatively coupled. A network may translate to or from other protocols to one or more protocols of network devices. In some embodiments, a network may comprise a plurality of interconnected networks, such as, for example, the Internet, a service provider's network, a cable television network, corporate networks, and home networks.

Figure 4:
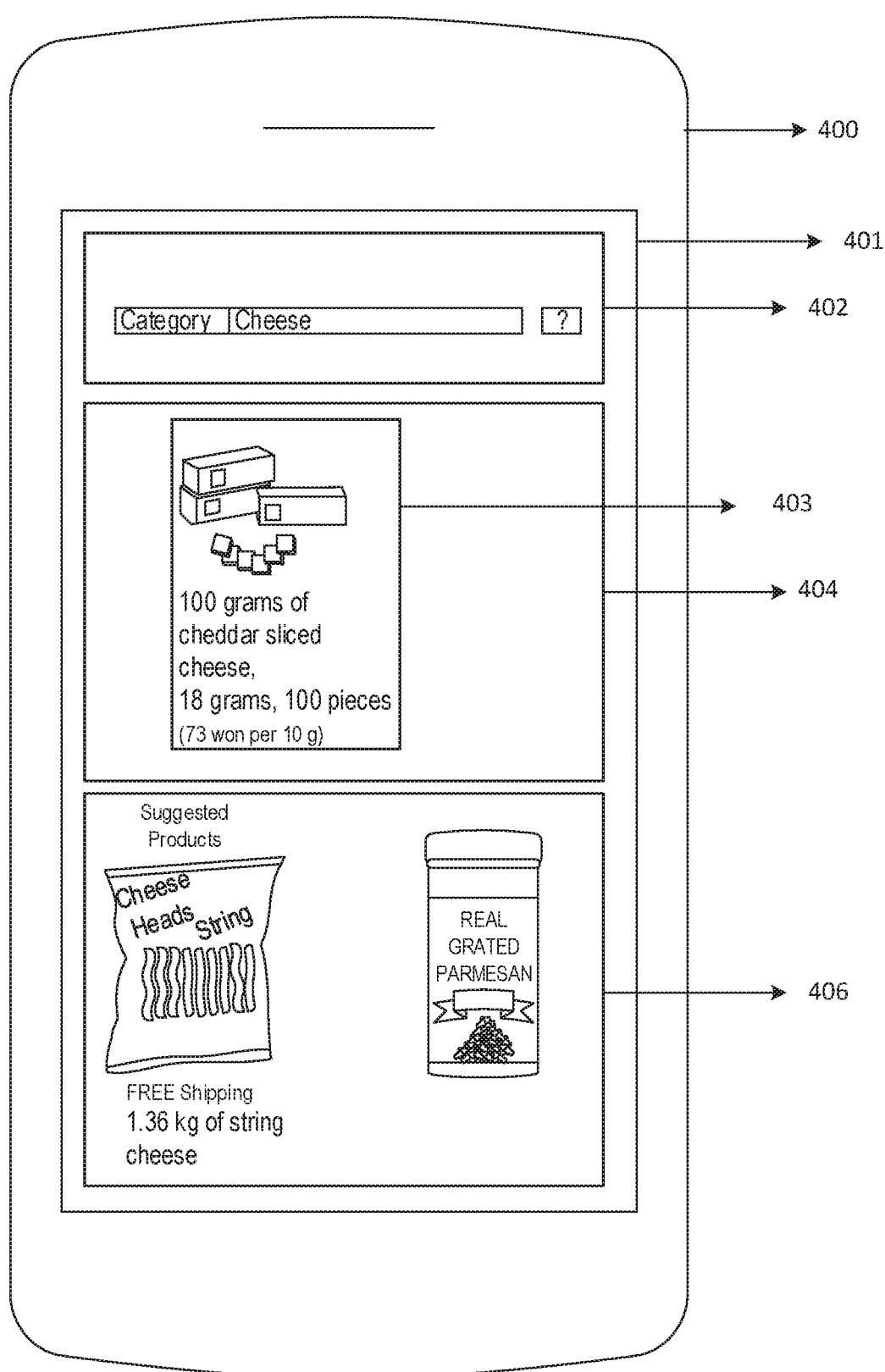
FIG. 4 is a diagram illustrating an exemplary embodiment of a plurality of modules displayed on a user interface, consistent with the disclosed embodiments.

Referring now to FIG. 4, an exemplary user interface 401 of user device 400 displaying a plurality of modules 402, 404, 406 is shown. User device 400 may be implemented as user device 302 of FIG. 3. As discussed above, processor 303 of mobile service gateway 304 may be configured to display one or more modules 402, 404, 406 on user interface 401. By way of example, processor 303 of mobile service gateway 304 may receive a product search request for "Cheese" from the user of user device 400. After receiving the request for "Cheese," processors 303 may obtain a mapped endpoint and a page layout associated with a product search for "Cheese" from modular platform 306. The page layout may be sent to API gateway 308.

Processor 303 may also receive one or more modules 402, 404, 406 from one or more modular providers to display on user interface 401. By way of example, the fluent interface of API gateway 308 may extract data from the user's product search request for "Cheese." Based on the extracted data, one or more modular providers, such as modular providers 310A-B may develop one or more modules 402, 404, 406 for display on the page layout. For example, one or more modular providers may develop module 402, which displays the user's product search request for "Cheese," module 404, which displays an advertisement for cheese, and module 406, which displays a list of suggested products related to cheese. In some embodiments, one or more modules 402, 404, 406 may comprise an activatable element configured to direct a user of user device 400 to a destination when activated. For example, activatable element 403 in module 404 may be activated by the user, e.g., by clicking on the activatable element 403 or touching the activatable element 403, and the user may be directed to another page layout to see additional details about the product or to purchase the product.

Each of the modules 402, 404, 406 may be developed by respective modular providers. In other embodiments, one modular provider may develop all of modules 402, 404, 406. Although FIG. 4 illustrates three modules 402, 404, 406, any number of modules may be displayed on user interface 401. In some embodiments, modules 402, 404, 406 may be developed and loaded in parallel. For example, modular providers may develop respective modules 402, 404, 406 in parallel, and processor 303 may load modules 402, 404, and 406 in parallel in order to reduce latency in displaying content on user interface 401. In other embodiments, one or more modules 402, 404, 406 may be prioritized based on its assigned position on user interface 401. For example, processor 303 may assign module 402 to the top of the page layout on user interface 401, module 404 to the middle of the page layout on user interface 401, and module 406 to the bottom of the page layout on user interface 401. The position of modules 402, 404, 406 may be adjustable by one or more entities in system 300, including for example, mobile service gateway 304, API gateway 308, and/or one or more modular providers 310A-B. Additionally or alternatively, the number of modules displayed on the page layout may be adjustable. Because module 402 is assigned to the top of the page layout, the development of module 402 may be prioritized. Then, the development of module 404 may be prioritized over that of module 406, and so forth.

In some embodiments, mobile service gateway 304 may comprise a circuit breaker configured to prevent a failure with one or more modules from interfering with the display of other modules on the mobile application platform or user interface 401. By way of example, if module 404 fails to load, circuit breaker of mobile service gateway 304 may be configured to allow processor 303 to continue receiving and displaying modules 402 and 406 such that user of user device 400 does not experience latency.

Figure 5:
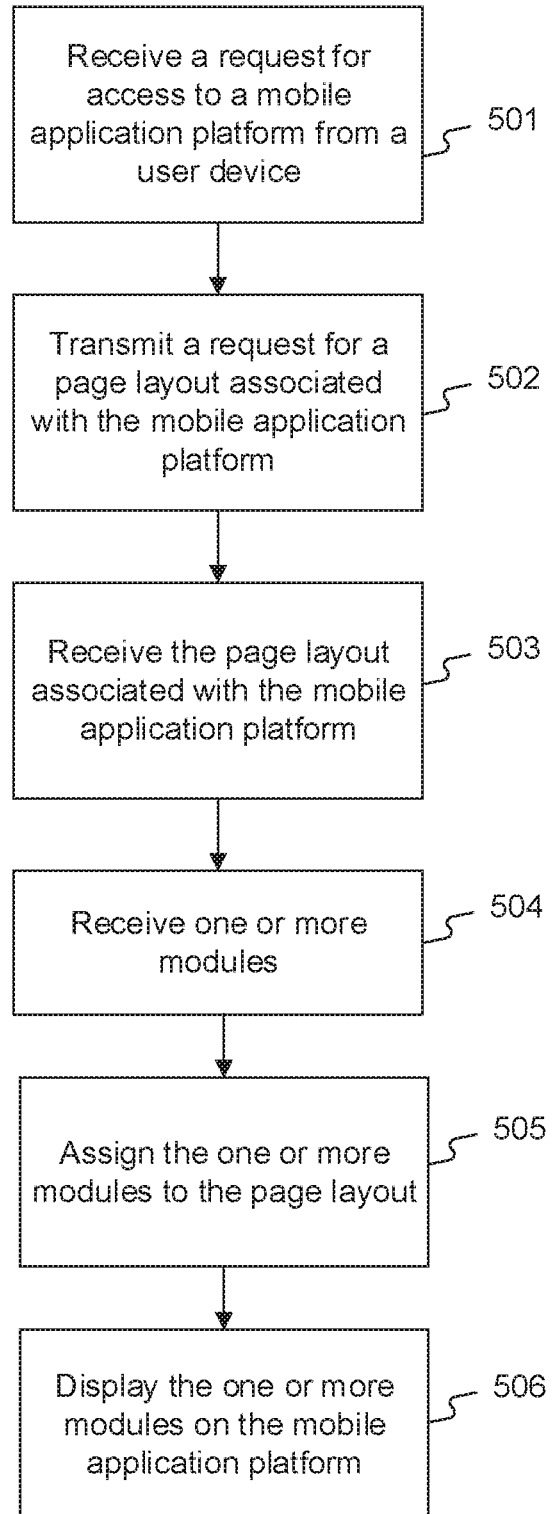
FIG. 5 is a flowchart illustrating an exemplary embodiment of a method for modular loading of information on a user interface, consistent with the disclosed embodiments.

FIG. 5 is a flow chart illustrating an exemplary method 500 for modular loading of information on a user interface. This exemplary method is provided by way of example. Method 500 shown in FIG. 5 can be executed or otherwise performed by one or more combinations of various systems. Method 500 as described below may be carried out by mobile service gateway 304, as shown in FIG. 3, by way of example, and various elements of that system are referenced in explaining the method of FIG. 5. Each block shown in FIG. 5 represents one or more processes, methods, or subroutines in the exemplary method 500. Referring to FIG. 5, exemplary method 500 may begin at block 501.

At block 501, processor 303 of mobile service gateway 304 may receive a request for access to a mobile application platform from a user device, such as user device 302 and/or user device 400. For example, when a user opens a mobile application and inputs the user's log-in information, such as user ID and password, to the mobile application, processor 303 may receive a request for access to the mobile application platform from the user device. In response, processor 303 of mobile service gateway 304 may perform various functions, such as authenticating the user and storing log files.

After receiving the request for access from the user, method 500 may proceed to block 502. At block 502, processor 303 may transmit a request for a page layout associated with the mobile application platform. For example, processor 303 may transmit a request to modular platform 306 for a page layout mapped to the user's request for access to the mobile application platform. The page layout mapped to the user's request for access to the mobile application platform may, for example, comprise the main page layout of the mobile application when the user first accesses the mobile application platform. Then, method 500 may proceed to block 503.

At block 503, processor 303 may receive the page layout associated with the mobile application platform, for example, from modular platform 306. Processor 303 may also send the page layout information and the user's request for access to the mobile application platform to API gateway 308. API gateway 308 may extract data associated with the user's request to identify information that can be used to develop one or more modules for display on the page layout. For example, a fluent interface of API gateway 308 may extract data associated with the user's request and send the extracted data to one or more modular providers, such as modular providers 310A-B, to develop one or more modules for display on the page layout.

Method 500 may proceed to block 504, at which processor 303 may receive one or more modules developed by modular provider(s) via the fluent interface of API gateway 308. The number of modules received may vary based on the user's request received at block 501. Then, method 500 may proceed to block 505, at which processor 303 may assign the received one or more modules to the page layout. In some embodiments, modular provider(s) may have already identified a position associated with each module in the page layout. In other embodiments, processor 303 may assign each module to a position in the page layout. In some embodiments, the modules may be positioned based on the user's request. For example, the modules most relevant to the user's request may be displayed at the top of the page layout, while modules displaying product advertisements may be displayed at the bottom of the page layout.

After assigning the module(s) to the page layout, method 500 may proceed to block 506. At block 506, processor 303 may display the one or more modules in the page layout on the mobile application platform. As discussed above, the one or more modules assigned to the page layout may be displayed in parallel to reduce latency in content loading or page loading. In some embodiments, processor 303 may, via a circuit breaker, be configured to prevent a failure with one or more modules from interfering with the display of other modules on the mobile application platform or user interface. Accordingly, if one of the received modules fails to load, processor 303 may be configured to continue displaying the other modules in the page layout such that user of the user device does not experience latency.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for modular loading of information on a user interface, the system comprising:
    a memory storing instructions; and
    at least one processor configured to execute the instructions to:
        receive, by a mobile service gateway, a request for access to a mobile application platform from a user device;
        transmit, to an internal application programming interface (API) gateway, a request for a page layout associated with the mobile application platform;
        receive, from the API gateway, the page layout associated with the mobile application platform;
        receive a plurality of modules;
        assign the plurality of modules to positions in the page layout, wherein:
            the plurality of modules are developed using a fluent interface based on a relevancy of the plurality of modules to the request from the user device and based on position information of the plurality of modules, wherein:
                a module of the plurality of modules most relevant to the request is assigned to the top of the page layout and developed first using the fluent interface, and
                a module of the plurality of modules least relevant to the request is assigned to the bottom of the page layout and developed last using the fluent interface, the fluent interface is configured to extract data associated with requests for the plurality of modules, and each module is developed based on the extracted data; and display the plurality of modules on the mobile application platform.

2. The system of claim 1, wherein one or more modular providers are configured to parse the extracted data and identify at least one of metadata associated with each module or position information associated with each module.

3. The system of claim 2, wherein the one or more modular providers are configured to aggregate at least one of the identified metadata or position information for the plurality of modules.

4. The system of claim 1, wherein the mobile service gateway comprises at least one of authentication service, logging service, or monitoring service.

5. The system of claim 1, wherein the mobile service gateway comprises a circuit breaker configured to prevent a failure with at least one of the plurality of modules from interfering with the display of the plurality of modules on the mobile application platform.

6. The system of claim 1, wherein the developed modules are stored in a database.

7. The system of claim 1, wherein the developed modules comprises an activatable element configured to direct a user of the user device to a destination when activated.

8. The system of claim 1, wherein a number of modules assigned to the page layout is adjustable.

9. The system of claim 1, wherein the fluent interface is configured to receive a plurality of requests for data associated with each module in parallel.

10. The system of claim 9, wherein the plurality of requests are prioritized based on a position information associated with each module.

11. A computer-implemented method for modular loading of information on a user interface, the method comprising:
receiving, by a mobile service gateway, a request for access to a mobile application platform from a user device;
transmitting, to an internal application programming interface (API) gateway, a request for a page layout associated with the mobile application platform;
receiving, from the API gateway, the page layout associated with the mobile application platform;
receiving a plurality of modules;
assigning the plurality of modules to positions in the page layout, wherein:
the plurality of modules are developed using a fluent interface based on a relevancy of the plurality of modules to the request from the user device and based on position information of the plurality of modules, wherein:
a module of the plurality of modules most relevant to the request is assigned to the top of the page layout and developed first using the fluent interface, and
a module of the plurality of modules least relevant to the request is assigned to the bottom of the page layout and developed last using the fluent interface,
the fluent interface is configured to extract data associated with requests for the plurality of modules, and
each module is developed based on the extracted data; and
displaying the plurality of modules on the mobile application platform.

12. The method of claim 11, wherein one or more modular providers are configured to parse the extracted data and identify at least one of metadata associated with each module or position information associated with each module.

13. The method of claim 12, wherein the one or more modular providers are configured to aggregate at least one of the identified metadata or position information for the plurality of modules.

14. The method of claim 11, wherein the mobile service gateway comprises at least one of authentication service, logging service, or monitoring service.

15. The method of claim 11, wherein the mobile service gateway comprises a circuit breaker configured to prevent a failure with at least one of the plurality of modules from interfering with the displaying of the plurality of modules on the mobile application platform.

16. The method of claim 11, wherein the developed modules are stored in a database.

17. The method of claim 11, wherein the developed modules comprises an activatable element configured to direct a user of the user device to a destination when activated.

18. The method of claim 11, wherein the fluent interface is configured to receive a plurality of requests for data associated with each module in parallel.

19. The method of claim 18, wherein the plurality of requests are prioritized based on a position information associated with each module.

20. A computer-implemented system for modular loading of information on a user interface, the system comprising:
a memory storing instructions; and
at least one processor configured to execute the instructions to:
receive, by a mobile service gateway, a request for access to a mobile application platform from a user device;
transmit, to an internal application programming interface (API) gateway, a request for a page layout associated with the mobile application platform;
receive, from the API gateway, the page layout associated with the mobile application platform;
receive a plurality of modules;
assign the plurality of modules to positions in the page layout, wherein:
the plurality of modules are developed using a fluent interface based on a relevancy of the plurality of modules to the request from the user device and based on position information of the plurality of modules, wherein:
a module of the plurality of modules most relevant to the request is assigned to the top of the page layout and developed first using the fluent interface, and
a module of the plurality of modules least relevant to the request is assigned to the bottom of the page layout and developed last using the fluent interface,
the fluent interface is configured to extract data associated with requests for the plurality of modules, one or more modular providers are configured to parse the extracted data, identify a position information associated with each module, and develop each module based on the extracted data, and the developed modules are stored in a database; and
display the plurality of modules on the mobile application platform.

* * * * *